United States Patent
Yao et al.

(10) Patent No.: US 10,783,485 B2
(45) Date of Patent: Sep. 22, 2020

(54) INTEGRATED CONTAINER MANAGEMENT SYSTEM

(71) Applicant: SAP SE, Walldorf (DE)

(72) Inventors: Raymond Yao, Shanghai (CN); Xin Chen, Shanghai (CN); Philippe Nemery, Shanghai (CN)

(73) Assignee: SAP SE, Walldorf (DE)

( * ) Notice: Subject to any disclaimer, the term of this patent is extended or adjusted under 35 U.S.C. 154(b) by 888 days.

(21) Appl. No.: 15/168,386

(22) Filed: May 31, 2016

(65) Prior Publication Data
US 2017/0344942 A1 Nov. 30, 2017

(51) Int. Cl.
*G06Q 10/08* (2012.01)
*G06Q 10/10* (2012.01)

(52) U.S. Cl.
CPC ..... *G06Q 10/0836* (2013.01); *G06Q 10/1093* (2013.01)

(58) Field of Classification Search
CPC ................................. G06Q 10/0836
USPC ....................................... 705/339
See application file for complete search history.

(56) References Cited

U.S. PATENT DOCUMENTS

| | | | |
|---|---|---|---|
| 5,049,026 A | 9/1991 | Bingman et al. | |
| 6,148,291 A * | 11/2000 | Radican | G06Q 10/08 705/22 |
| 6,785,718 B2 | 8/2004 | Hancock et al. | |
| 7,650,297 B1 | 1/2010 | Baker et al. | |
| 9,505,559 B1 * | 11/2016 | Cai | B65G 47/50 |
| 2006/0111929 A1 | 5/2006 | Poole et al. | |
| 2013/0016636 A1 * | 1/2013 | Berger | G06Q 10/08 370/310 |
| 2013/0262251 A1 * | 10/2013 | Wan | G06Q 10/0836 705/26.1 |

(Continued)

OTHER PUBLICATIONS

Optimization of Convenience Stores Distribution System with Web Scrapping and Google API Service (Year: 2015).*

(Continued)

*Primary Examiner* — Jeff Zimmerman
*Assistant Examiner* — Zeina Elchanti
(74) *Attorney, Agent, or Firm* — Fish & Richardson P.C.

(57) ABSTRACT

An input corresponding to a time window is received in an integrated container management system. For containers of a specific container type, a network flow solver implementing a multi-commodity network flow problem is executed based on the input. A graph is generated with nodes representing depot locations, mode of transport locations and customer locations. Arcs connecting nodes, and representing operations and costs associated with the nodes are generated. Pick-up arcs are generated between the depot locations and customer locations. Return arcs are generated between the customer locations and the depot locations. Street turn arcs are generated among customer locations. Unload load arcs are generated between the mode of transport locations and the depot locations. Output tables are generated with values representing functionalities associated with container repositioning, container pick-up and return, and container street turn. Container repositioning, container pick-up and return, and container street turn are optimized based on the values in the output table.

18 Claims, 9 Drawing Sheets

(56) References Cited

U.S. PATENT DOCUMENTS

| | | | | |
|---|---|---|---|---|
| 2013/0297463 | A1* | 11/2013 | Garber | G06Q 10/087 705/28 |
| 2015/0248639 | A1* | 9/2015 | Maney | G06Q 10/08345 705/335 |
| 2016/0004997 | A1 | 1/2016 | Maney et al. | |
| 2016/0042444 | A1 | 2/2016 | Hengelbrock et al. | |
| 2016/0055438 | A1* | 2/2016 | Cen | G06Q 10/06315 705/7.25 |
| 2016/0307155 | A1* | 10/2016 | Bell | G06Q 10/06315 |

OTHER PUBLICATIONS

Leiyi Yao et al; "Reducing Complexity of Determining Routes for Shipping Containers by Reducing Paths Based on User Selection"; US Utility Application; U.S. Appl. No. 14/973,136, filed Dec. 17, 2015; 60 pages.

Raymond Yao et al; "Optimized Container Management System"; US Utility Application; U.S. Appl. No. 15/168,415, filed May 31, 2016; 58 pages.

Sebastian Sterzik et al; "Reducing hinterland transportation costs through container sharing"; appears in Flexible Services and Manufacturing Journal; Sep. 2012: 21 pages; https://www.researchgate.net/profile/Won_Young_Yun/publication/257563116_Reducing_hinterland_transportation_costs_through_container_sharing/links/546b22b00cf20dedafd42ea9.pdf.

Alan L. Erera et al; "Global intermodal tank container management for the chemical industry"; published by Elsevier; in Transportation Research Part E 41 (2005), pp. 551-566; http://www.sciencedirect.com/science/article/pii/S1366554505000499.

Dong-Ping Song et al; "Empty container repositioning in liner shipping"; published in Maritime Policy & Management; Aug. 2009; vol. 36, No. 4, pp. 291-307; https://www.researchgate.net/publication/248989064_Empty_container_repositioning_in_liner_shipping.

Rafael Epstein et al: "A Strategic Empty Container Logistics Optimization in a Major Shipping Company" Published Online: Feb. 1, 2012; 12 pages; http://pubsonline.informs.org/doi/abs/10.1287/inte.1110.0611.

* cited by examiner

Vessel flow table

| VESSEL_ID | MTR | FROM_LOCATION | TO_LOCATION | FROM_ARRIVAL_TIME | TO_DEPARTURE_TIME | TO_ARRIVAL_TIME | TO_DEPARTURE_TIME | TRIP_COST | FLOW | CONTAINER_TYPE |
|---|---|---|---|---|---|---|---|---|---|---|
| ship1 | 1 | B | A | 2 | 3 | 4 | 6 | 0 | 4 | A |

Unload/ load flow table

| VESSEL_ID | MTR | VISIT_LOCATION | DEPOT_LOCATION | VESSEL_ARRIVAL_TIME | VESSEL_DEPARTURE_TIME | DEPOT_TIME | UNLOAD_LOAD_MODE | HANDLING_COST | SUPPLY_DEMAND | SAFETY_STOCK | MAXIMUM_STOCK | FLOW | CONTAINER_TYPE |
|---|---|---|---|---|---|---|---|---|---|---|---|---|---|
| ship1 | 1 | A | A | 4 | 6 | 5 | GATE IN | 400 | -5' | 0 | 10 | 4 | A |
| ship1 | 1 | B | B | 2 | 3 | 2 | GATE OUT | 400 | 0 | 0 | 10 | 4 | A |

Storage table

| LOCATION | FROM_TIME | TO_TIME | SAFETY_STOCK | MAXIMUM_STOCK | STORAGE_COST | FLOW | CONTAINER_TYPE |
|---|---|---|---|---|---|---|---|
| B | 0 | 1 | 0 | 10 | 300 | 3 | A |
| B | 1 | 2 | 0 | 10 | 500 | 5 | A |
| B | 2 | 3 | 0 | 10 | 100 | 1 | A |

FIG. 3C

INTEGRATED CONTAINER MANAGEMENT SYSTEM

FIELD

Illustrated embodiments generally relate to data processing, and more particularly to a system to perform integrated container management.

BACKGROUND

Container shipping companies/operators may manage millions of containers per month. Container shipping companies manage a balance between supply and demand in various locations while minimizing operation costs. Various operations in container management include managing transportation of empty containers, and assigning customers to a specific location for pick up and return of containers. The operations such as managing transportation of empty containers, and assigning customers to a specific location for pick up and return of containers are treated as individual sub-problems, and addressed individually. The result of one sub-problem becomes input of another sub-problem.

Since the transportation of empty containers to various locations and assigning customers to a specific location are performed as individual tasks one after the other, there is no co-ordination between them. For example, 'customer A' may require a container from 'location A'. Current booking information shows that an empty container is available in 'location B'. Empty container is moved from 'location B' to 'location A'. At the same time, an empty container was ready to be returned by 'customer B' to 'location A'. Transportation of empty containers and assigning customers to a location for container pick-up were not considered globally, resulting in an inefficient movement of empty containers from 'location B' to 'location A'. Hence, it is challenging to balance supply and demand of containers in various locations in order to increase the containers utilization while minimizing operation costs.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIGS. 3A, 3B and 3C in combination illustrate an exemplary use case of integrated container management, according to one embodiment.

DETAILED DESCRIPTION

Figure 1:
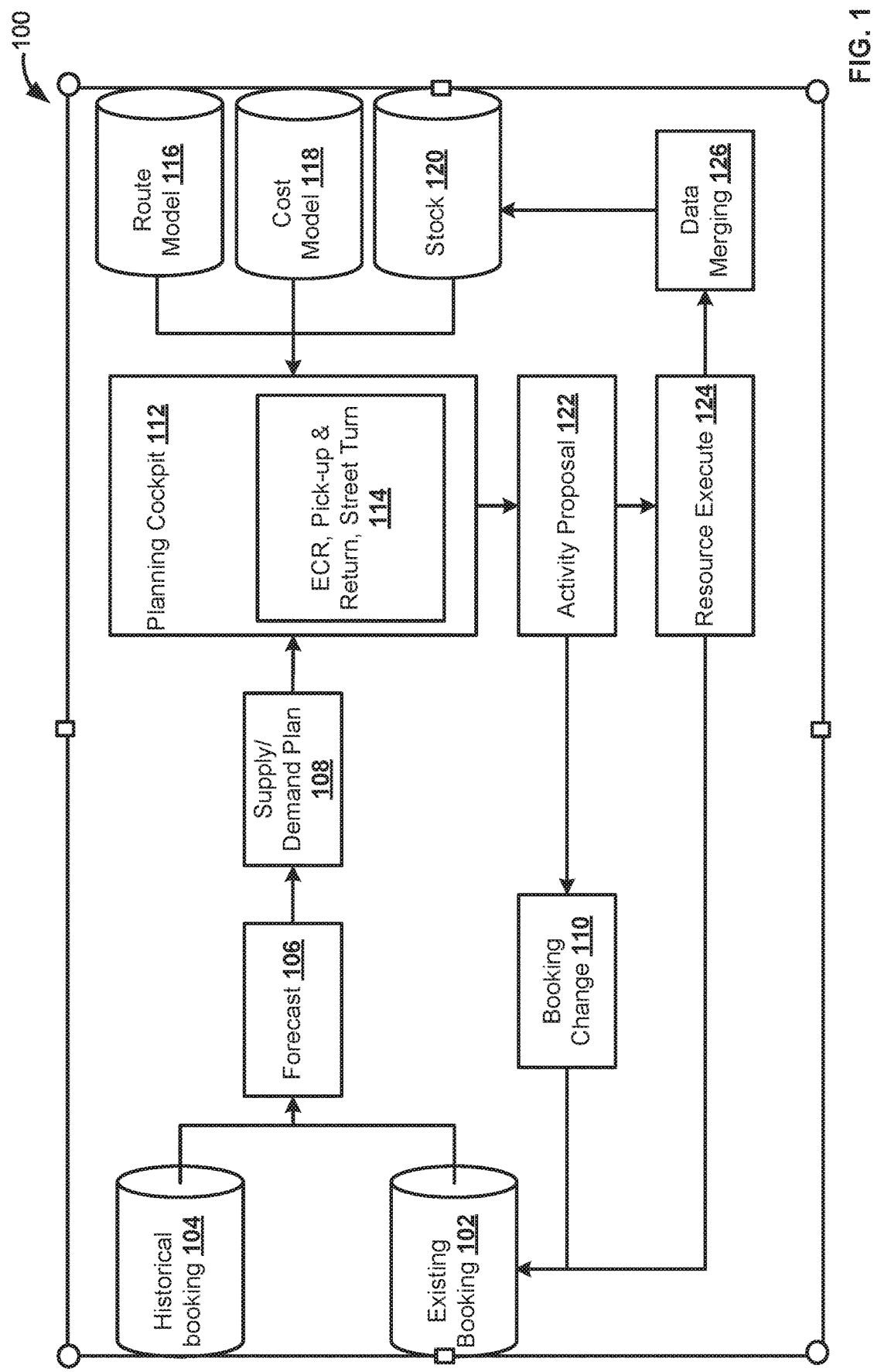
FIG. 1 is a block diagram illustrating architecture of various components in integrated container management system, according to one embodiment.

Embodiments of techniques for integrated container management system are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

A depot is a location owned or managed by a container shipping company where containers are stored. The depot may be inside a harbor or in a city. The depot has a safety stock and a maximum stock threshold. The empty containers stocked in the depot have to be maintained higher than the safety stock, and lower than the maximum stock threshold. A vessel is used for transporting containers between depots. The vessel is treated as a moving depot that has a fixed schedule. When a vessel visits a depot, goods can be loaded from the depot to the vessel referred to as loading, and the goods can be unloaded from the vessel to the depot referred to as unloading. The containers may be transported between depots using two types of routing methods. The first method referred to as inland moving, is a direct service or lane service using one of the mode of transport such as trucks, trains or barges. The second method referred to as intermodal transportation uses a combination of services from trucks, trains, barges, etc.

There are three types of costs involved in transportation of containers —handling cost, transportation cost and storage cost. Handling cost is the expense related to labor such as loading/unloading containers from one mode of transport to the other. Transportation cost is the expense involved in moving containers between various locations. When a customer uses a haulage contractor for movement of containers, it is referred to as merchant haulage. When a container shipping company uses its own haulage contactor to provide movement of containers to the customers, it is referred to as carrier haulage. Based on whether merchant haulage or carrier haulage is used, transportation cost varies. If merchant haulage is used, the transportation cost is borne by the customer. If carrier haulage is used, the transportation cost is borne by the shipping company. Storage cost is the expense for storing empty containers in depots, which is generally calculated by the number of days a container stays in a depot. For example, for an empty 20 feet container, the storage cost may be free between day 0 and day 7. For an empty 20 feet container the storage cost may be $100 between day 8 and day 14. Storage cost is associated with a time duration.

FIG. 1 is a block diagram illustrating architecture 100 of various components in integrated container management system, according to one embodiment. Containers can be booked, and the details of the booking are maintained in existing booking module 102. A booking request has a booking number, container type, quantity of container, time and location. Historical booking requests are maintained in historical booking module 104. Based on the existing booking requests, and historical booking requests, forecast module 106 predicts or forecasts the supply and demand of containers as supply demand plan 108. Modifications or changes to current booking requests are managed in booking change module 110. Planning cockpit 112 includes empty container repositioning (ECR), pick-up and return (PR) and street turn (ST) module 114. Export-dominant harbors or depots may have container shortages while import-dominant harbors accumulate empty containers. ECR helps reposition empty containers, and balance the supply and demand of containers at an optimum level at the depots.

Pick-up operation is to assign a specific depot location to a customer order where the customer can pick up empty containers. Return operation is to assign a specific depot location to a customer where empty containers may be returned. PR manages assignment of pick-up and return operations of containers to customers. ECR, PR and ST are integrated and the functions are collaborated in the planning cockpit 112. With the integration of ECR, PR and ST, based on existing booking requests, a previous customer may return an empty container to a depot where the next customer can pick-up, or, the empty containers are directly transported from last customer location to next customer location efficiently. Route model 116 generates route for the movement of containers. Cost model 118 is used to perform various cost calculations such as handling cost, transportation cost and storage cost. Stock 120 denotes the stock of available containers. Activity proposal 122 is generated based on the supply and demand plan provided to the planning cockpit 112. The activity proposal module 122 may include scheduled container movement, working hours of employees, etc. Resource execute module 124 enables calculation of supply demand plan based on the existing resources. Resources are merged using data merging 126.

Figure 2:
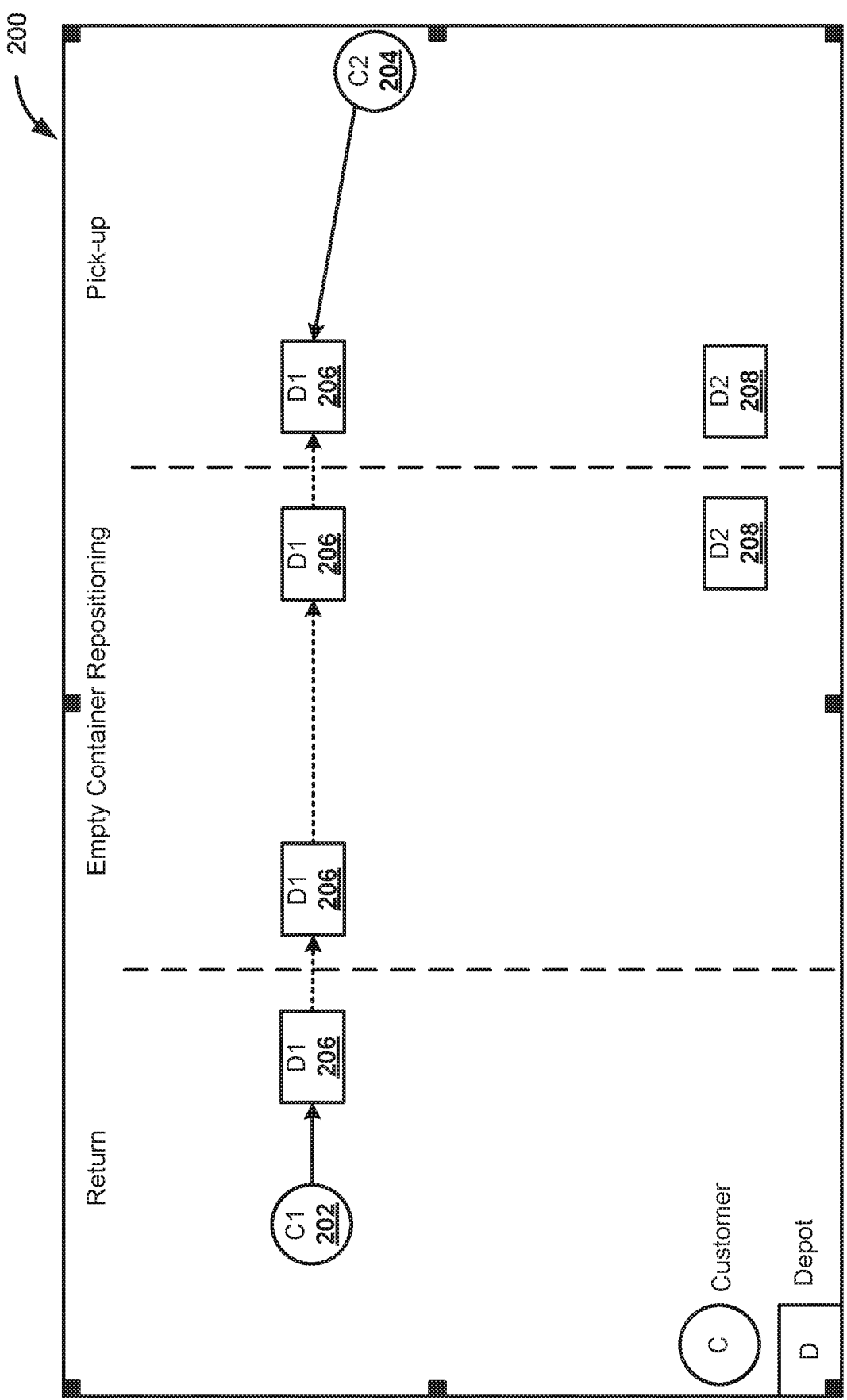
FIG. 2 is a flow diagram illustrating movement of containers in integrated container management system, according to one embodiment.

FIG. 2 is flow diagram 200 illustrating movement of containers in integrated container management system, according to one embodiment. In the integrated container management system, ECR PR and ST operations are considered simultaneously. Nodes 'C1' 202 and 'C2' 204 represent customers, and nodes 'D1' 206 and 'D2' 208 represent depots. The flow represented by arrows indicates a direction of movement of an empty container. In a booking request, customer 'C2' 204 requests for an empty container. Customer 'C1' 202 intends to return an empty container. Customer 'C1' 202 returns the empty container to a depot 'D1' 206. Customer 'C2' 204 is closer to depot 'D1' 206 than 'D2' 208. Since customer 'C2' 204 requests for the empty container, the empty container is retained at depot 'D1' 206 for customer 'C2' 204 to pick-up. Because of the integration between components ECR, PR and ST, the empty container returned by customer 'C1' 202 is synchronized with the booking request from customer 'C2' 204. Therefore, the empty container is not repositioned to depot 'D2' 208 from depot 'D1' 206, but retained at depot 'D1' 206 for customer 'C1' 202 to pick up.

Figure 3A:
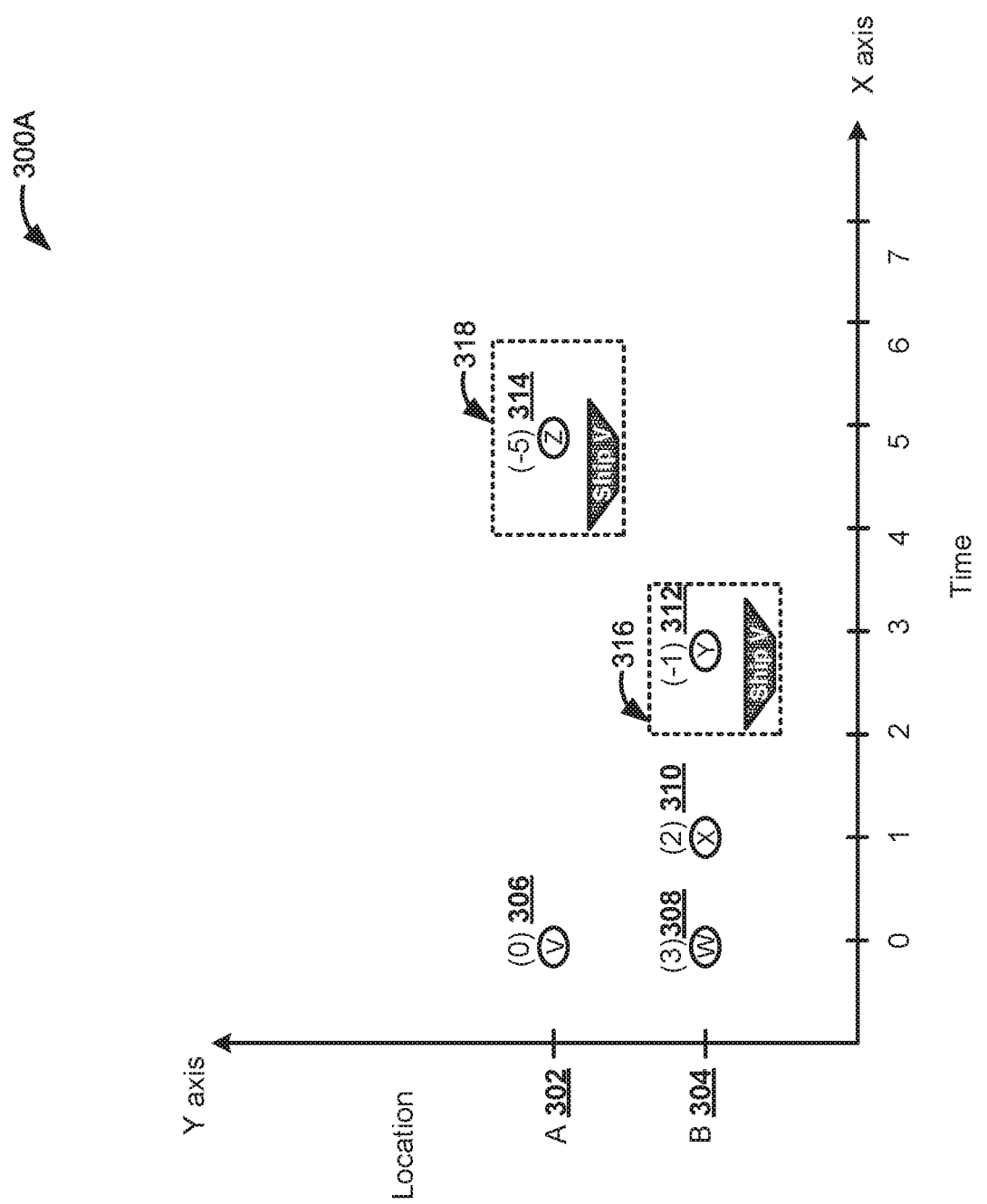
Figure 3B:
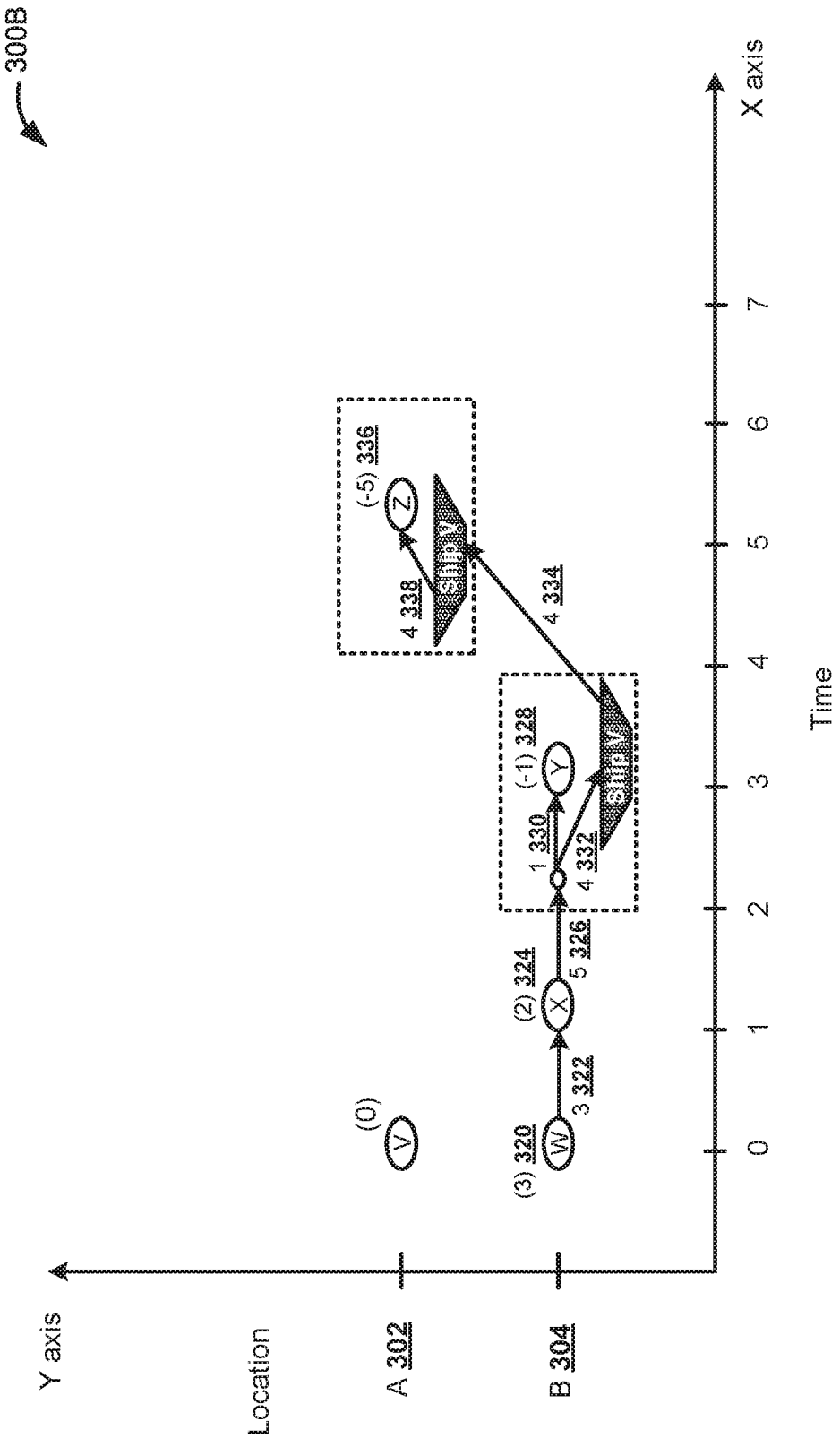

FIGS. 3A, 3B and 3C in combination illustrate an exemplary use case of integrated container management, according to one embodiment. A graphical representation 300A is illustrated in FIG. 3A, with location depicted in 'y axis' and time depicted in 'x axis' of a graph. Building nodes and arcs based on the data in the use case generates the graph. Two depot locations 'A' 302 and 'B' 304 are shown in the 'y axis'. The depot locations have stock information of containers associated with the respective depot locations. A single vessel 'ship V' with no booking information, and a single type of container are considered in the below use case. Supply and demand of containers are forecasted, and a graph is generated based on the forecast. A node is generated with a specific location indicating a change of supply and demand of containers. Initially, at time '0', the supply and demand of containers in depot 'V' is '0' 306, and the supply and demand of containers in depot 'W' is '3' 308. The supply and demand of containers is indicated within parenthesis near the depot node. Supply and demand of containers at time '0' represents the initial stock of containers, i.e., the initial stock of containers in depot 'V' is '0' 306, and initial stock of containers in depot 'W' is '3' 308. Supply and demand of containers at time '1' in depot 'X' is '2' 310. Positive number for the supply and demand of containers indicates the number of available containers, and the supply of containers is more than demand. Negative number for the supply and demand of containers indicates the number of deficient containers, and the demand of containers is more than supply.

A vessel is used for transporting containers, and the vessel is treated as a moving depot that has a fixed schedule. The vessel on different locations in the schedule is considered as different nodes in the graph. A new node is generated each time the vessel visits the depot. The vessel 'ship V' arrives at depot location 'Y' at time '2' and departs at time '3'. Supply and demand of containers in depot 'Y' is '−1' 312. Supply and demand '−1' 312 indicates a deficit of one container in depot 'Y'. Similarly, the vessel arrives at depot location 'Z' at time '4' and departs at time '6'. Supply and demand of containers in depot 'Z' is '−5' 314. '−5' 314 indicates a deficit of five container in depot 'Z'. Dotted rectangles 316 and 318 indicate that the vessel and the depot are in the same location. Storage cost in both the depots 'A' 302 and 'B' 304 are $100 from day '0' to day '10', and handling costs are $100 for loading and unloading. For this exemplary use case, a network flow solver is invoked to solve the integrated ECR, PR and ST operations on the graph, and a result graph, and output tables are generated.

The objective of the network flow solver is to balance the supply and demand of containers in different depot locations in a given period of time. The network flow solver is based on a multi-commodity network flow problem. The mathematical representation of multi-commodity network flow problem is shown below:

$$\min \sum_q \sum_{(i,j) \in A} C_{ij} X_{jq} \text{ s.t.} \sum_{i:(i,k) \in A} X_{ikq} - \sum_{j:(k,j) \in A} X_{kjq} = -b_{kq}, k \in N,$$

$$q \in Q \sum_q X_{ijq} \le Y_{ij}, (i,j) \in A, q \in Q \, X_{ijq} \ge 0, (i,j) \in A, q \in Q$$

where set 'Q' denotes the types of containers. $X_{ijq}$ is the quantity of container of type q from node i to node j. $B_{kq}$ is the supply demand value of node k. $C_{ij}$ is the cost unit from node i to node j. $Y_{ij}$ is the capacity of the arc from node i to node j. Using the network flow solver, a graph is built for each type of container, where depots and vessels with a specific time and location schedule are treated as nodes, while arcs are generated between nodes according to different operations such as unloading, loading, storage and transportation. The nodes are created based on vessels' schedule, inland moving and supply-demand plan.

Using network flow solver on the graph 300A, flow graph 300B is generated. The network flow solver implements solution for the multi-commodity network flow problem. In one embodiment, a structured query language interface associated with an in-memory database may be used in the graph generation. Initially there are '3' containers as shown in 320 at depot 'W'. Flow representing container repositioning starts from depot 'W' at time '0'. Flow between depot 'W' and depot 'X' represents repositioning of '3' containers as shown in 322. At depot 'X', availability of containers is '2' 324. Flow between depot 'X' and depot 'Y' represents repositioning of '5' containers as shown in 326, i.e., '3' 320 containers from depot 'W' and '2' 324 containers from depot 'X'. In depot 'Y' there is deficiency of one container indicated by '−1' 328. Accordingly, one container from among the '5' containers is repositioned to depot 'Y'. This is shown as flow representing '1' 330. Remaining '4' containers are repositioned from the depot 'X' to the vessel 'ship V'. This is shown as flow representing '4' 332. The vessel 'ship V' leaves depot 'Y' and arrives at depot 'Z' at time '4'. The vessel 'ship V' repositions '4' containers to depot 'Z' as shown in 334. In the depot 'Z' there is a deficiency of five containers and it is indicated by '−5' 336. The vessel 'ship V' repositions '4' containers to depot 'Z' as shown in '4' 338.

Based on the graph 300B, tables such as vessel flow table, load/unload flow table, and storage table 300C are generated, as shown in FIG. 3c. In the vessel flow table, row 340, shows that a vessel with vessel identifier 'ship 1', and means of transport or mode of transport (MTR) identifier '1', starts from depot location 'B' and reaches depot location 'A'. The vessel arrives at time '2' as shown in 'from arrival time' of the vessel, and the vessel departs at time '3' as shown in 'from departure time' of the vessel. The vessel moves from depot location 'B' to depot location 'A'. The vessel arrives at time '4' as shown in 'to arrival time' of the vessel, and the vessel departs at time '6' as shown in 'to departure time' of the vessel. Trip cost for this trip is '0'. Flow represents repositioning of containers. When the vessel 'ship 1' moves from depot location 'B' to depot location 'A', '4' containers are repositioned. Accordingly, the flow between depot location 'B' and depot location 'A' is '4'. The vessel 'ship 1' is carrying containers of type 'A'.

In unload/load flow table, row 342, a vessel with vessel identifier 'ship 1' and MTR identifier '1', visits depot location 'A'. The vessel arrives at time '4' as shown in 'vessel arrival time', and the vessel departs at time '6' as shown in 'vessel departure time'. The vessel remains in depot at time '5'. The vessel came into depot through in gate. Handling cost of the vessel at the depot is '400', and it is the expense related to labor such as loading/unloading. At depot location 'A', supply demand is '−5' i.e., 5 containers are deficient in depot location 'A'. The vessel 'ship 1' has a safety stock of '0' containers, and a maximum stock of '10' containers. When the vessel moves from depot location 'B' to depot location 'A'. '4' containers are repositioned. Accordingly, the flow between depot location 'B' and depot location 'A' is '4'. The vessel 'ship 1' is carrying container type 'A'.

Similarly, in row 344, the vessel with vessel identifier 'ship 1', and means of transport identifier '1', visits depot location 'B'. The vessel arrives at time '2' as shown in 'vessel arrival time', and the vessel departs at time '3' as shown in 'vessel departure time'. The vessel remains in depot at time '2'. The vessel leaves the depot through out-gate. Handling cost of the vessel at the depot is '400', and it is the expense related to labor such as loading/unloading. At depot location 'B', supply demand is '0' i.e., no containers are either available or deficient in depot location 'B'. The vessel 'ship 1' has a safety stock of '0' containers, and a maximum stock of '10' containers. When the vessel moves from depot location 'B' to depot location 'A'. '4' containers are repositioned. Accordingly, the flow between depot location 'B' and depot location 'A' is '4'. The vessel 'ship 1' is carrying container type 'A'.

In storage table, in row 346, for location 'B', from time '0' to time '1', safety stock of containers is '0' and the maximum stock is '10'. The storage cost per container is $100, accordingly for 3 containers; the storage cost is $300. Flow indicating container repositioning between depot location 'W' and 'X' is '3' for location 'B'. The vessel 'ship 1' is carrying container type 'A'. Similarly, in row 348, from time '1' to time '2', safety stock of containers is '0' and the maximum stock is '10'. The storage cost per container is $100, accordingly for 5 containers; the storage cost is $500. Flow indicating container repositioning between depot location 'X' and 'Y' is '5'. The vessel 'ship 1' is carrying container type 'A'. In row 350, from time '2' to time '3', safety stock of containers is '0' and the maximum stock is '10'. The storage cost per container is $100, accordingly for 1 container; the storage cost is $100. Flow indicating container repositioning between depot location 'X' and 'Y' is '1'. The vessel 'ship 1' is carrying container type 'A'.

Figure 4:
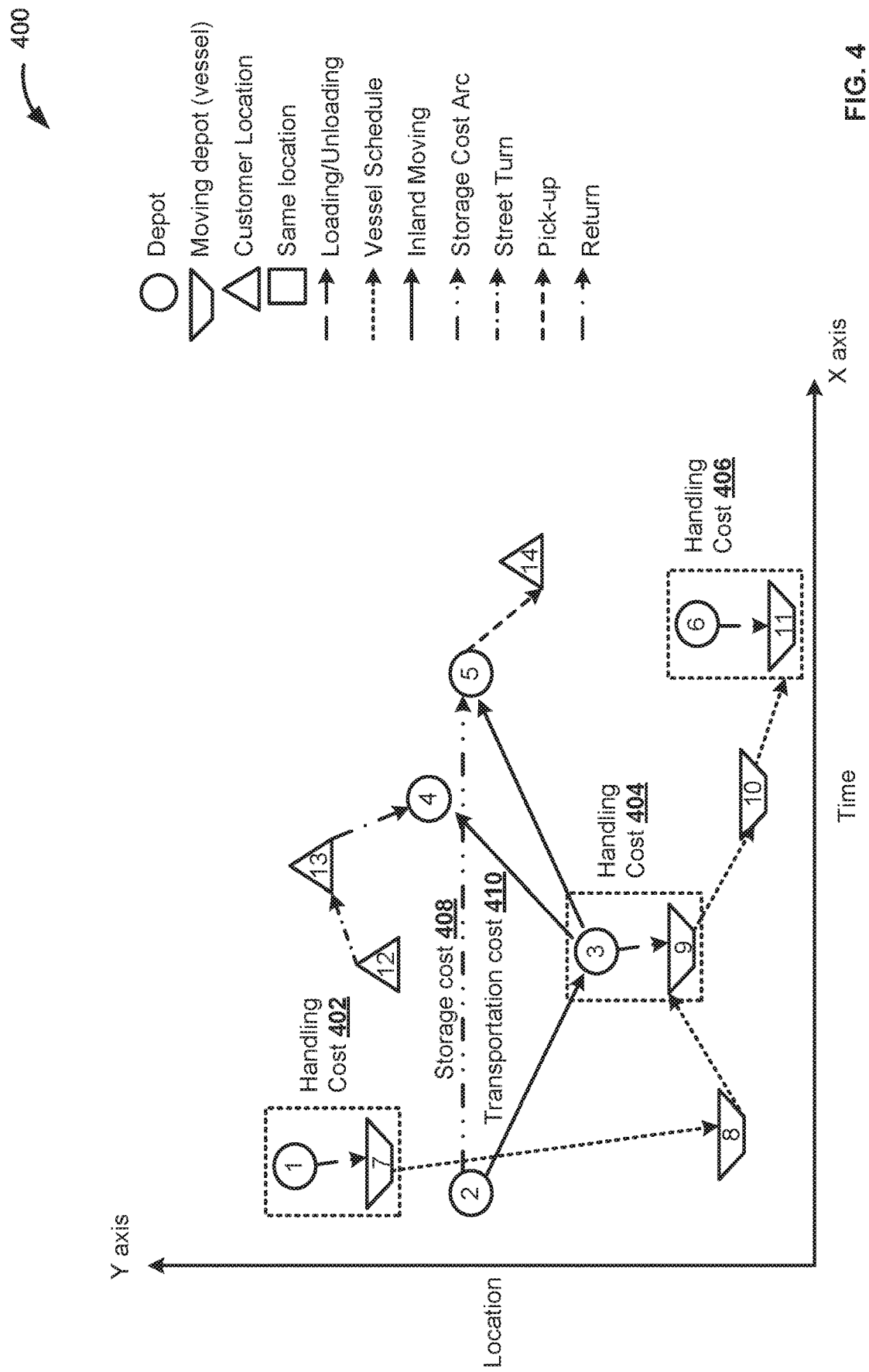
FIG. 4 is a graph illustrating an exemplary use case of integrated container management, according to one embodiment.

FIG. 4 is graph 400 illustrating an exemplary use case of integrated container management, according to one embodiment. A graphical representation is illustrated with location depicted in 'y axis' and time depicted in 'x axis' of a graph. A network flow solver is invoked to solve the integrated ECR, PR and ST operations and generate the graph 400. A vessel is used for transporting containers, and the vessel is treated as a moving depot that has a fixed schedule. The vessel on different locations in the schedule is considered as different nodes in the graph. A new node is generated each time the vessel visits the depot and a node is identified with a unique node identifier. Depot location identified with node identifier '1' and a vessel with identifier '7' are in same location. Handling cost 402 is associated with loading/unloading containers from depot location '1' to vessel with identifier '7'. Similarly, handling cost 404 is associated with loading/unloading containers from depot location '3' to vessel with identifier '9', and handling cost 406 is associated with loading/unloading containers from depot location '6' to vessel with identifier '11'. Depot '2' and '5' are associated with storage cost 408, and a storage arc or flow is associated between the depot locations '2' and '5'. Storage arc is associated with a time interval. Vessel schedule or vessel movement follows a path indicated by dotted arrows between vessel identifiers '7', '8', '9', '10' and '11'. Inland movement method of routing is used between the depot locations '2', '3', '4' and '5'. Transportation cost 410 is associated with the Inland movement. Customer location '14' is assigned a pick-up depot location '5', where the customer can pick-up empty containers from the depot location '5'. Street turn allows empty containers to be transported from last customer location '12' to next customer location '13' directly. Street turn depends on constraints such as customer permission where a customer permits or opts for street turn model, physical distance between the customer locations are within a predetermined range, the customer picking up a container and the customer returning the container handle same or identical container type, and booking interval between the customer picking up the container and the customer returning the container are within a predetermined acceptable time limit. Customer location '13' is assigned to depot '4' where the customer can return the container.

Figure 5:
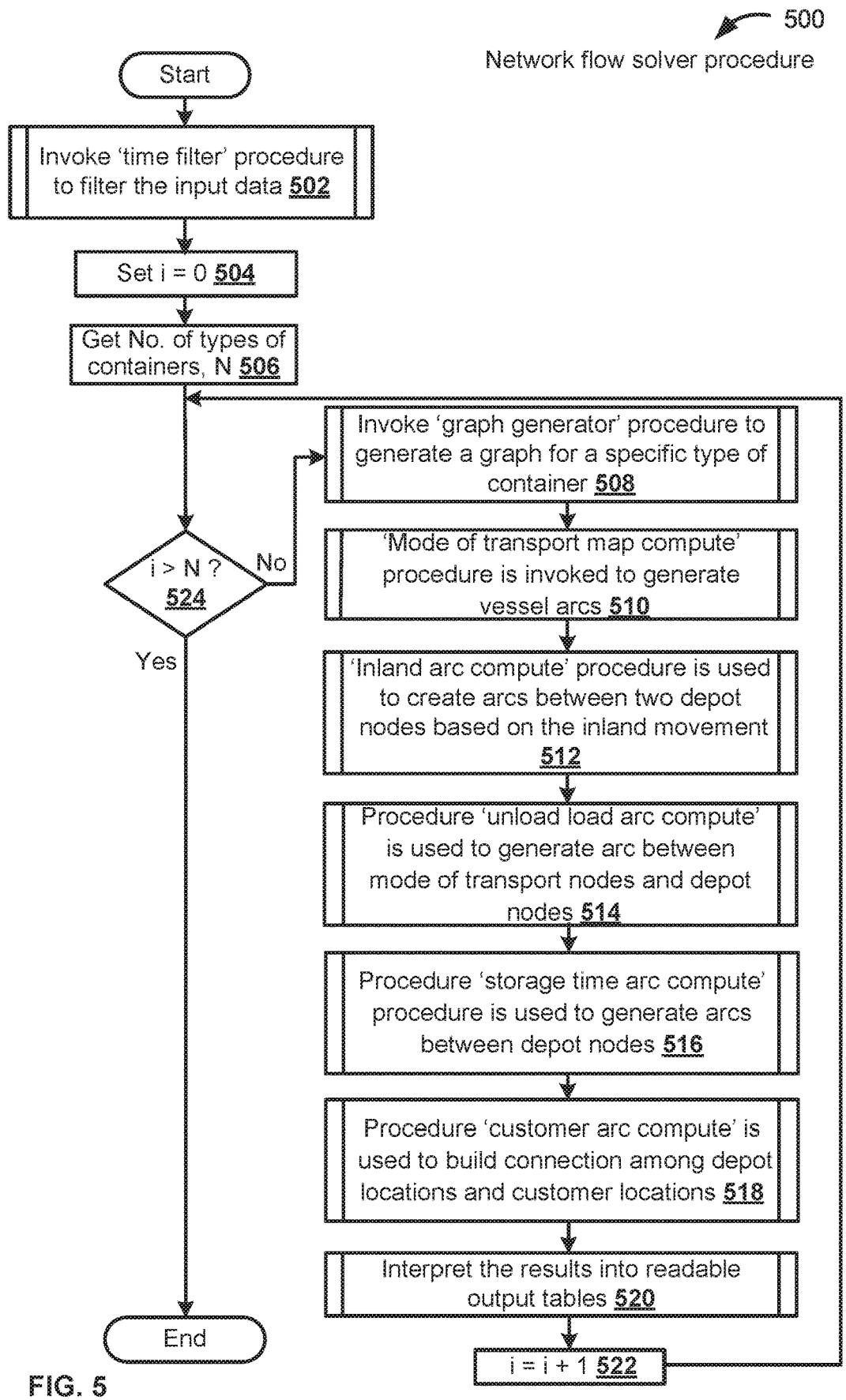
FIG. 5 is a flow diagram illustrating process 500 of integrated container management, according to one embodiment.

FIG. 5 is a flow diagram illustrating process of network flow solver 500, according to one embodiment. In transportation resource planning, a network flow solver is used. The objective of network flow solver procedure 500 is to balance the supply and demand of containers in different depots in a given period of time. Using the network flow solver, a graph is built for each type of container, where depots, various mode of transport such as train, truck, vessels, etc., with a specific time and location schedule are treated as nodes, while arcs are generated between nodes according to different operations such as unloading, loading, storage and transportation. Locations visited by the various mode of transport may be referred to as mode of transport locations. Network flow solver procedure 500 is a main entrance to the solver. Various procedures in the network flow solver implement the representation of multi-commodity network flow problem. At 502, 'time filter' procedure is invoked to filter input data for a given time window, for example, time 100 to 1000. The network flow solver works on the segment of input data filtered for the given time window. Individual type of container is treated as sub-problem that is solved by the network flow solver. At 504, a variable 'i' is initialized to '0'. At 506, number of types of containers is received in variable 'N'. At 508, for individual type of container, a procedure 'graph generator' is invoked to generate a graph. The procedure 'graph generator' is used to create nodes and arcs for a specific type of container. The nodes are created based on schedule of various mode of transport involved, inland moving and supply-demand plan. At 510, 'mode of transport map compute' procedure is invoked to generate arcs corresponding to the mode of transport nodes. This procedure parses the schedules, and output arc flow is generated between two modes of transport nodes. At 512, 'inland arc compute' procedure is used to create arcs between two depot nodes based on the inland movement. At 514, procedure 'unload load arc compute' is used to generate arc between mode of transport nodes and depot nodes. The direction of arc indicates whether the operation is unload or load. At 516, 'storage time arc compute' procedure is used to generate arcs between depot nodes. The arcs are used to calculate storage cost. At 518, procedure 'customer arc compute' is used to build connection among depot locations and customer locations. Pick-up arcs are built from depot location to customer location. Return arcs are built from customer location to depot location. Street turn arcs are built from customer location to customer location. The solver only suggests the street turn solution when the difference of two customer-planned dates is in the predefined time window. At 520, the results are interpreted into readable output tables. Accordingly, pick-up, return and street turn of containers is optimized based on the generated arcs in the graph and the generated output tables. At 522, increment the variable 'i' by one. At 524, it is determined whether variable 'i' is greater than variable 'N'. Upon determining that the variable 'i' is greater than variable 'N' 508 to 522 is repeated for every container type.

Figure 6:
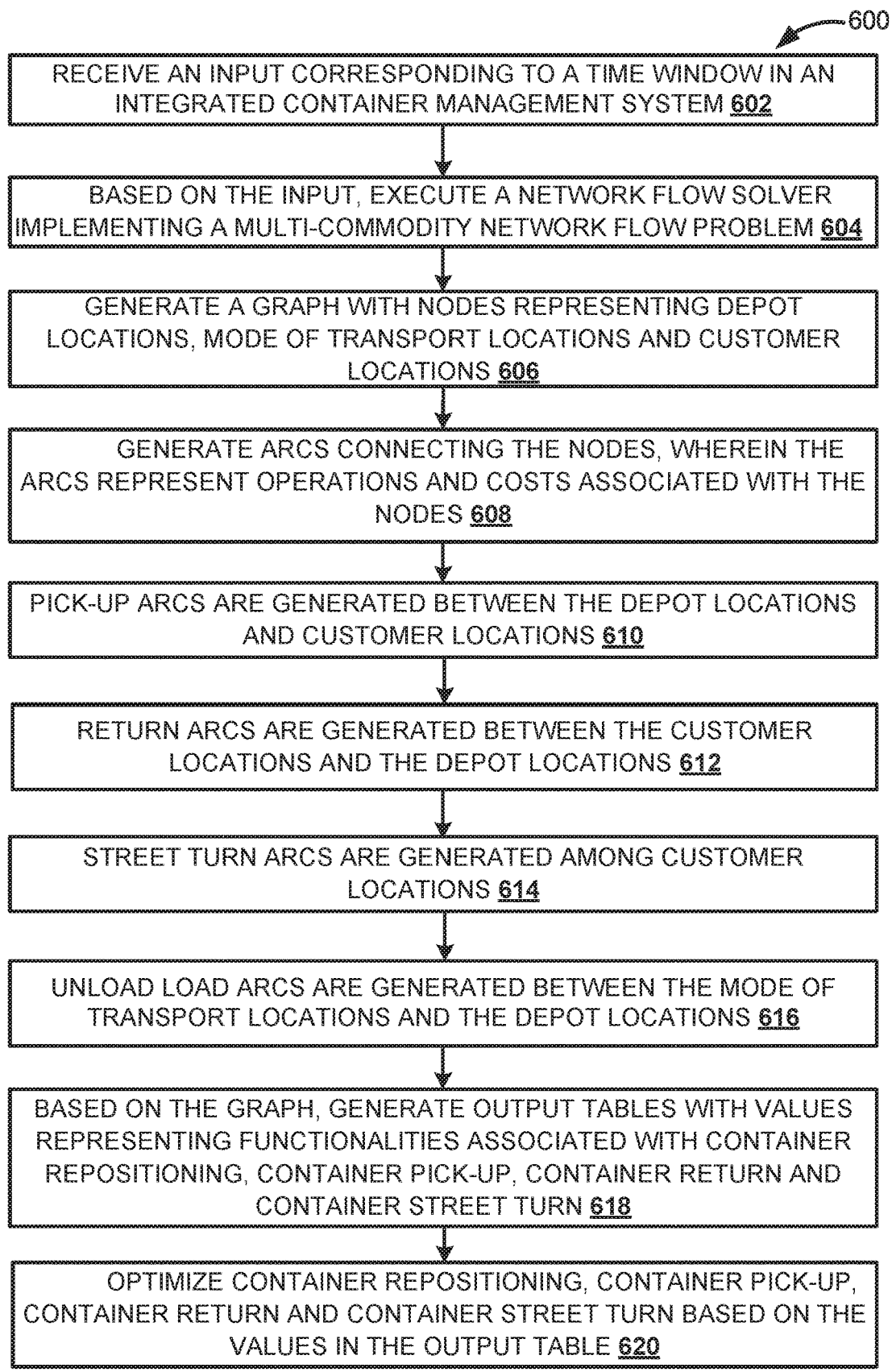
FIG. 6 is a flow diagram illustrating process 600 of integrated container management, according to one embodiment.

FIG. 6 is a flow diagram illustrating process 600 of integrated container management, according to one embodiment. At 602, an input corresponding to a time window is received in an integrated container management system. For containers of a specific container type 604 to 620 is executed. At 604, a network flow solver implementing a multi-commodity network flow problem is executed based on the input. At 606, a graph is generated with nodes representing depot locations, mode of transport locations and customer locations. At 608, arcs representing operations and costs associated with the nodes are generated. The arcs connect the nodes. At 610, pick-up arcs are generated between the depot locations and customer locations. At 612, return arcs are generated between the customer locations and the depot locations. At 614, street turn arcs are generated among customer locations. At 616, unload load arcs are generated between the mode of transport locations and the depot locations. The direction of the unload load arcs determine whether the operation is unload or load. At 618, output tables are generated with values representing functionalities associated with container repositioning, container pick-up and return, and container street turn, based on the graph. At 620, container repositioning, container pick-up and return, and container street turn are optimized by executing 604 to 618 in the process 600.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
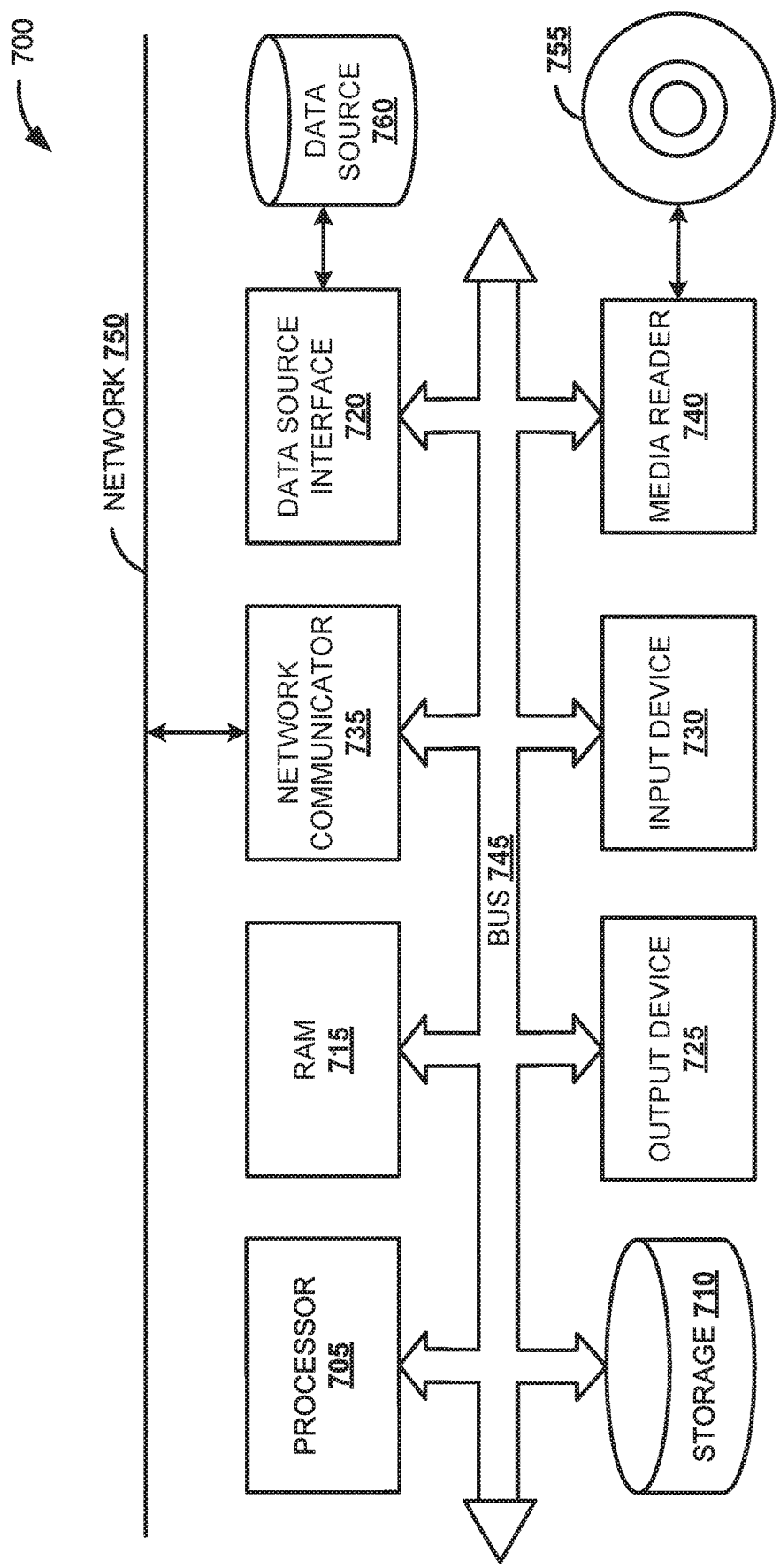
FIG. 7 is a block diagram illustrating an exemplary computer system, according to one embodiment.

FIG. 7 is a block diagram of an exemplary computer system 700. The computer system 700 includes a processor 705 that executes software instructions or code stored on a computer readable storage medium 755 to perform the above-illustrated methods. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system. XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
receive an input corresponding to a time window in an integrated container management system;
for a first container type of a plurality of container types:
based on the input, execute a network flow solver implementing a multi-commodity network flow problem;
generate a graph with nodes represented on a two-dimensional chart including a time axis and a location axis, the nodes representing corresponding depot locations, mode of transport locations, and customer locations, wherein the nodes are positioned on the two-dimensional chart to correspond to pairs of time and location coordinate values, the nodes being generated based on a schedule of one or more modes of transport associated with the container type, the customer locations, and the depot locations, wherein the nodes are connected with arcs, wherein the arcs represent operations and costs associated with the nodes, wherein one or more nodes from the nodes of the graph corresponding to one or more locations of an instance of the mode of transport being a moving depot, wherein the moving depot corresponds to a fixed schedule, and wherein the one or more nodes associated with the one or more locations of the instance of the mode of transport being the moving depot correspond to fixed schedule points in relation to the time axis and the location axis, wherein one or more arcs of the arcs are generated to define a flow of movement of containers of the first container type between nodes from the graph, wherein an arc from the one or more arcs is generated between a pair of nodes correspondingly associated with a first location of the instance of the mode of transport and a depot location;
based on the graph, generate output tables with values representing information for transportation properties associated with container repositioning, container pick-up, container return, and container street turn;
optimize container repositioning, container pick-up, container return, and container street turn based on the values in the output tables; and based on the generated graph and the output tables, generate a path for repositioning a container of the first container type to a customer location from the customer locations, wherein the path includes a set of nodes from the graph based on evaluating the values in the output tables, wherein generating the path includes associating a node of the graph associated with the customer location with a second node of the graph associated with the first location of the instance of the mode of transport, and wherein the one or more nodes of the graph associated with the instance of the mode of transport correspond to one or more locations of the instance of the mode of transport according to the fixed schedule, wherein the one or more location of the instance of the mode of transport comprises the first location of the instance of the mode of transport.

2. The computer-readable medium of claim 1, further comprises instructions which when executed by the computer further cause the computer to:
forecast supply and demand values of containers to generate the graph; and
generate flow values for the arcs of the graph, wherein the flow values represent number of repositioned containers.

3. The computer-readable medium of claim 1, wherein generating the graph with the nodes further comprises generating the arcs, wherein generating the arc further comprising instructions which when executed by the computer further cause the computer to:
parse a schedule of a mode of transport of the one or more mode of transport locations; and
based on the schedule of the mode of transport, generate one or more arcs connecting a set of nodes from the nodes of the graph, the set of nodes being associated with the mode of transport locations.

4. The computer-readable medium of claim 3, wherein generating the arcs further comprising instructions which when executed by the computer further cause the computer to:
generate pick-up arcs between nodes associated with the depot locations and the customer locations;
generate return arcs between nodes associated with the customer locations and the depot locations;
generate street turn arcs among node associated with the customer locations;
generate storage arcs between nodes associated with depot locations corresponding to a time duration; and
generate unload load arcs between nodes associated with the mode of transport locations and the depot locations.

5. The computer-readable medium of claim 1, wherein input is based on booking requests received from customers.

6. The computer-readable medium of claim 4, based on the street turn arcs, containers are transported from a last customer location to a next customer location from the customer locations associated with nodes in the generated graph.

7. A computer-implemented method of integrated container management, the method comprising:
for a first container type of a plurality of container types:
based on input comprising a time window in an integrated container management system, execute a network flow solver implementing a multi-commodity network flow problem;
generate a graph with nodes represented on a two-dimensional chart including a time axis and a location axis, the nodes representing corresponding depot locations, mode of transport locations, and customer locations, wherein the nodes are positioned on the two-dimensional chart to correspond to pairs of time and location coordinate values, the nodes being generated based on a schedule of one or more modes of transport associated with the container type, the customer locations, and the depot locations, wherein the nodes are connected with arcs, wherein the arcs represent operations and costs associated with the nodes, wherein one or more nodes from the nodes of the graph corresponding to one or more locations of an instance of the mode of transport being a moving depot, wherein the moving depot corresponds to a fixed schedule, and wherein the one or more nodes associated with the one or more locations of the instance of the mode of transport being the moving depot correspond to fixed schedule points in relation to the time axis and the location axis, wherein one or more arcs of the arcs are generated to define a flow of movement of containers of the first container type between nodes from the graph, wherein an arc from the one or more arcs is generated between a pair of nodes correspondingly associated with a first location of the instance of the mode of transport and a depot location;
based on the graph, generate output tables with values representing information for transportation properties associated with container repositioning, container pick-up, container return, and container street turn;
optimize container repositioning, container pick-up, container return, and container street turn based on the values in the output tables; and
based on the generated graph and the output tables, generate a path for repositioning a container of the first container type to a customer location from the customer locations, wherein the path includes a set of nodes from the graph based on evaluating the values in the output tables, wherein generating the path includes associating a node of the graph associated with the customer location with a second node of the graph associated with the first mode of transport location of the instance of the mode of transport locations, and wherein the one or more nodes of the graph associated with the instance of the mode of transport correspond to one or more locations of the instance of the mode of transport according to the fixed schedule, wherein the one or more location of the instance of the mode of transport comprises the first location of the instance of the mode of transport.

8. The method of claim 7, further comprising:
forecast demand and supply values of containers to generate the graph; and
generate flow values for the arcs of the graph, wherein the flow values represent number of repositioned containers.

9. The method of claim 7, wherein generating the graph with the nodes further comprises generating the arcs, wherein generating the arc further comprising instructions which when executed by the computer further cause the computer to:
parse a schedule of a mode of transport of the one or more mode of transport locations; and
based on the schedule of the mode of transport, generate one or more arcs connecting a set of nodes from the nodes of the graph, the set of nodes being associated with the mode of transport locations.

10. The method of claim 9, wherein generating arcs further comprising:
   generate pick-up arcs between nodes associated with the depot locations and the customer locations;
   generate return arcs between nodes associated with the customer locations and the depot locations;
   generate street turn arcs among nodes associated with customer locations;
   generate storage arcs between nodes associated with depot locations corresponding to a time duration; and
   generate unload load arcs between nodes associated with mode of transport locations and the depot locations.

11. The method of claim 10, wherein the input is based on booking requests received from customers, and wherein based on the street turn arcs, containers of the first container type are transported from one customer location to another customer location.

12. A computer system for integrated container management, comprising:
   a computer memory to store program code; and
   a processor to execute the program code, which when executed cause the computer system to:
      receive an input corresponding to a time window in an integrated container management system;
      for a first container type of a plurality of container types:
         based on the input, execute a network flow solver implementing a multi- commodity network flow problem;
         generate a graph with nodes represented on a two-dimensional chart including a time axis and a location axis, the nodes representing corresponding depot locations, mode of transport locations, and customer locations, wherein the nodes are positioned on the two-dimensional chart to correspond to pairs of time and location coordinate values, the nodes being generated based on a schedule of one or more modes of transport associated with the container type, the customer locations, and the depot locations, wherein the nodes are connected with arcs, wherein the arcs represent operations and costs associated with the nodes, wherein one or more nodes from the nodes of the graph corresponding to one or more locations of an instance of the mode of transport being a moving depot, wherein the moving depot corresponds to a fixed schedule, and wherein the one or more nodes associated with the one or more locations of the instance of the mode of transport being the moving depot correspond to fixed schedule points in relation to the time axis and the location axis, wherein one or more arcs of the arcs are generated to define a flow of movement of containers of the first container type between nodes from the graph, wherein an arc from the one or more arcs is generated between a pair of nodes correspondingly associated with a first location of the instance of the mode of transport and a depot location;
         based on the graph, generate output tables with values representing information for transportation properties associated with container repositioning, container pick-up, container return, and container street turn;
         optimize container repositioning, container pick-up, container return, and container street turn based on the values in the output tables; and
         based on the generated graph and the output tables, generate a path for repositioning a container of the first container type to a customer location from the customer locations, wherein the path includes a set of nodes from the graph based on evaluating the values in the output tables, wherein generating the path includes associating a node of the graph associated with the customer location with a second node of the graph associated with the first mode of transport location of the instance of the mode of transport locations, and wherein the one or more nodes of the graph associated with the instance of the mode of transport correspond to one or more locations of the instance of the mode of transport according to the fixed schedule, wherein the one or more location of the instance of the mode of transport comprises the first location of the instance of the mode of transport.

13. The system of claim 12, wherein the processor further executes the program code to:
   forecast supply and demand values of containers to generate the graph; and
   generate flow values for the arcs of the graph, wherein the flow values represent number of repositioned containers.

14. The system of claim 12, wherein the program code related to generating the graph with the nodes further comprises code which when executed cause the computer system to:
   parse a schedule of a mode of transport of the one or more mode of transport locations; and
   based on the schedule of the mode of transport, generate one or more arcs connecting a set of nodes from the nodes of the graph, the set of nodes being associated with the mode of transport locations.

15. The system of claim 14, wherein the program code further comprises code which when executed cause the computer system to:
   generate pick-up arcs between nodes associated with the depot locations and the customer locations;
   generate return arcs between nodes associated with the customer locations and the depot locations;
   generate street turn arcs among nodes associated with customer locations;
   generate storage arcs between nodes associated with depot locations corresponding to a time duration; and
   generate unload load arcs between nodes associated with mode of transport locations and the depot locations.

16. The system of claim 12, wherein the input is based on booking requests received from customers.

17. The system of claim 15, wherein based on the street turn arcs, containers of the first container type are transported from one customer location to another customer location.

18. The computer-readable medium of claim 1, wherein generating the path for repositioning the container of the first container type is based on a customer request, and wherein generating the path includes:
   determining the second node of the graph based on predetermined threshold criteria associated with the customer request.

* * * * *